US007717552B2

(12) United States Patent
Spivey

(10) Patent No.: US 7,717,552 B2
(45) Date of Patent: May 18, 2010

(54) ADJUSTABLE FOCUS EYEGLASSES WITH PIVOT ADJUSTMENTS

(75) Inventor: Brett Spivey, Carlsbad, CA (US)

(73) Assignee: Quexta, Inc., San Diego, CA (US)

(*) Notice: Subject to any disclaimer, the term of this patent is extended or adjusted under 35 U.S.C. 154(b) by 15 days.

(21) Appl. No.: 11/580,389

(22) Filed: Oct. 14, 2006

(65) Prior Publication Data

US 2007/0030440 A1 Feb. 8, 2007

Related U.S. Application Data

(63) Continuation-in-part of application No. 11/387,023, filed on Mar. 21, 2006, now Pat. No. 7,338,159, and a continuation-in-part of application No. 11/243,944, filed on Oct. 5, 2005, now Pat. No. 7,232,217, and a continuation-in-part of application No. 11/085,436, filed on Mar. 21, 2005, now Pat. No. 7,372,646.

(51) Int. Cl.
*G02C 7/08* (2006.01)
*G02C 13/00* (2006.01)

(52) U.S. Cl. .......................... 351/57; 351/178

(58) Field of Classification Search ................ 359/822, 359/823, 827; 351/41, 55–58, 178
See application file for complete search history.

(56) References Cited

U.S. PATENT DOCUMENTS 1,948,636 A 2/1934 Tillyer
3,507,565 A 4/1970 Alvarez et al.
3,617,116 A 11/1971 Jones
5,076,665 A 12/1991 Petersen
5,347,400 A 9/1994 Hunter
5,644,374 A 7/1997 Mukaiyama et al.
6,170,952 B1 1/2001 La Haye et al.
6,208,464 B1 3/2001 Tsukamoto et al.
6,702,439 B1* 3/2004 Lee ............................ 351/47
2005/0128428 A1* 6/2005 Hamaker et al. ............. 351/57
2006/0290885 A1 12/2006 Covannon et al.

OTHER PUBLICATIONS

"International Application Serial No. PCT/US2009/00696, International Search Report mailed Apr. 17, 2009", 5 pgs.
"International Application Serial No. PCT/US2009/00696, Written Opinion mailed Apr. 17, 2009", 6 pgs.

* cited by examiner

*Primary Examiner*—Alicia M Harrington
(74) *Attorney, Agent, or Firm*—Schwegman Lundberg & Woessner, P.A.

(57) ABSTRACT

A pair of adjustable focus eyeglasses having two lens units with at least one of the lens units having at least two lens elements. A mechanism is provided to pivot, about a pivot location outside each of the two lens elements, the position of at least one of the two lens elements relative to the other lens element in an angular direction generally perpendicular to a viewing direction. Specially designed surfaces are chosen such that small angular adjustments of the relative positions of the two lenses around a common pivot position in angular directions perpendicular or approximately perpendicular to a viewing direction results in changes in the combined focus of the two lenses of the lens unit. Preferred embodiments include two lens units with the lens system defining pairs of adjustable focus eyeglasses.

40 Claims, 7 Drawing Sheets

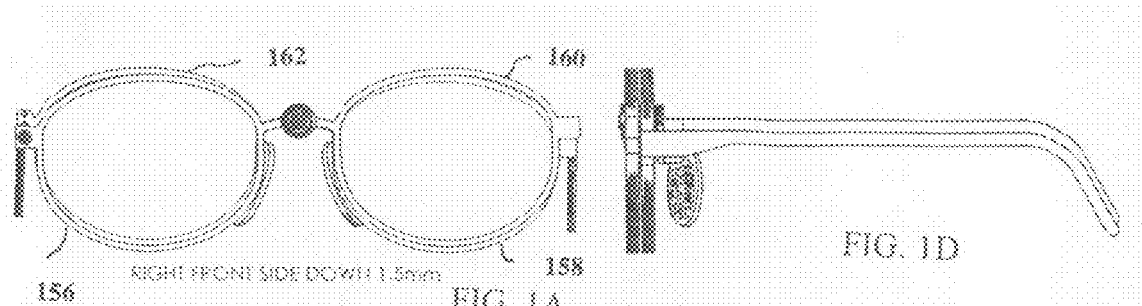
FIG. 1A
FIG. 1B
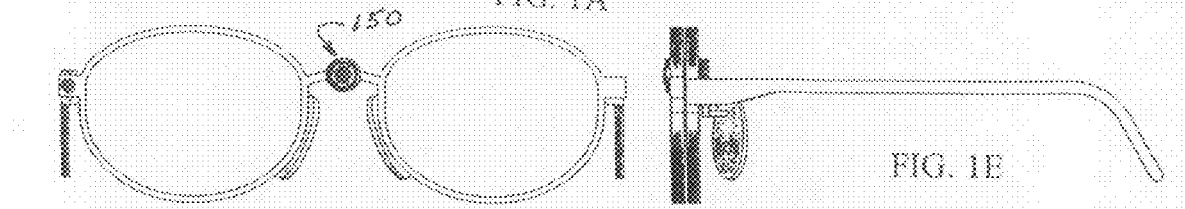
FIG. 1C
FIG. 1D
FIG. 1E
FIG. 1F
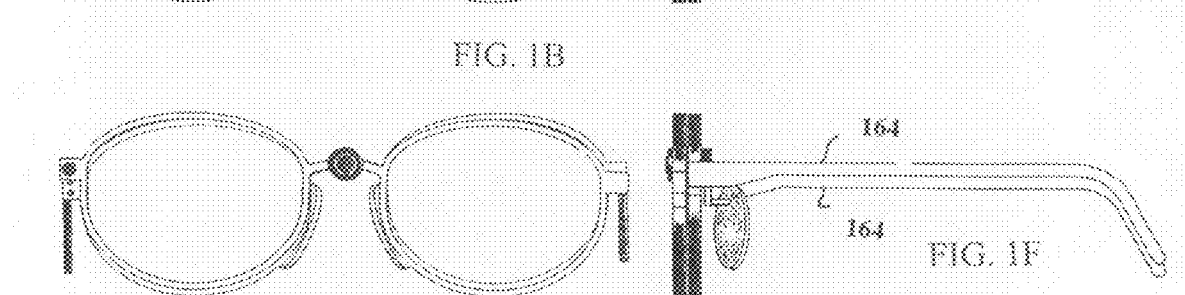
FIG. 1G
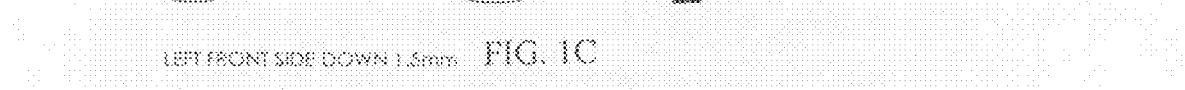

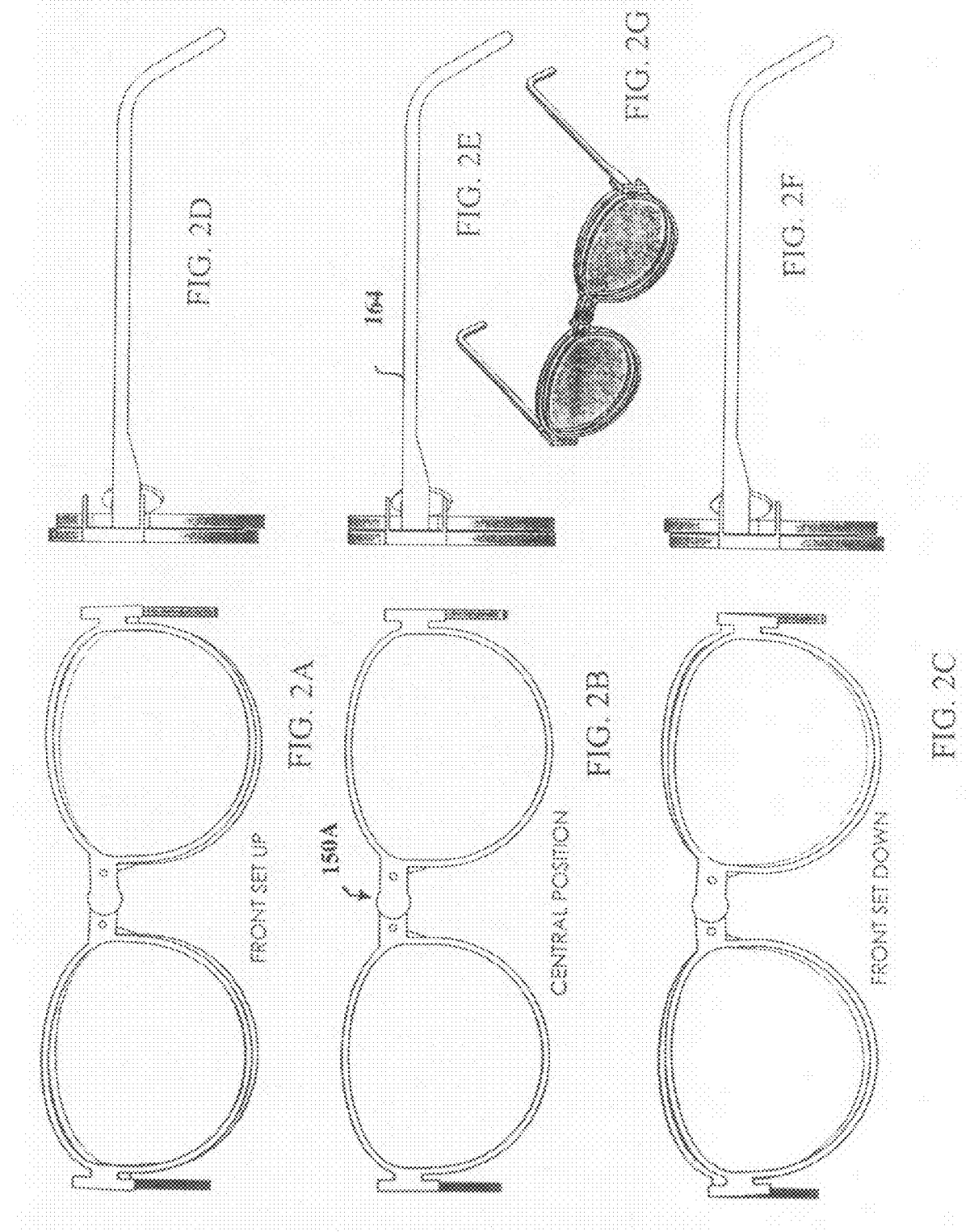

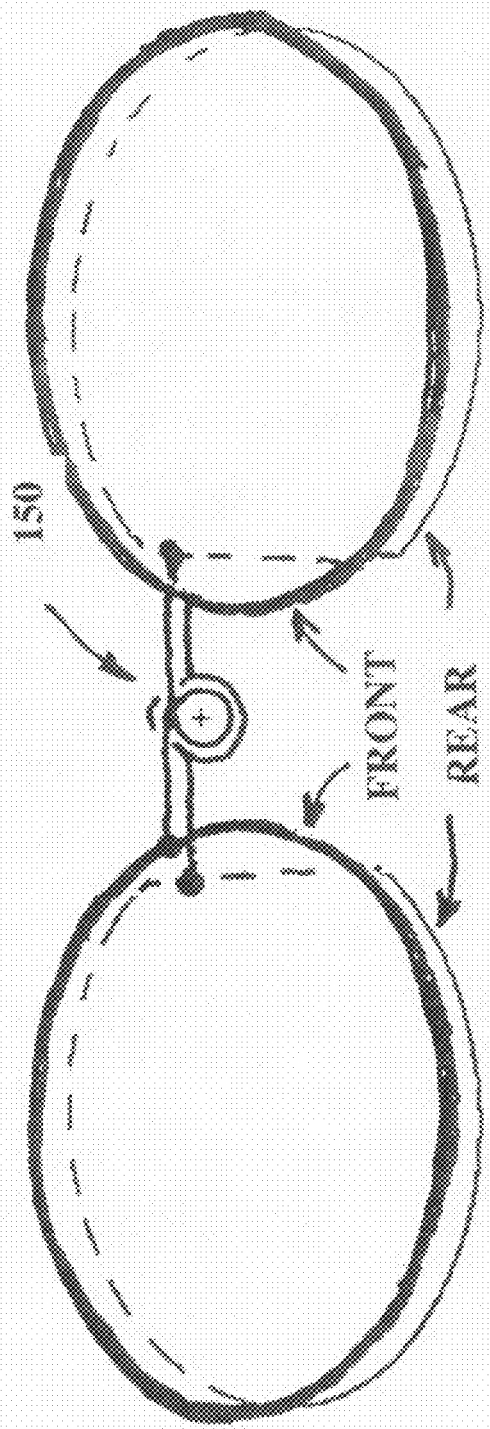

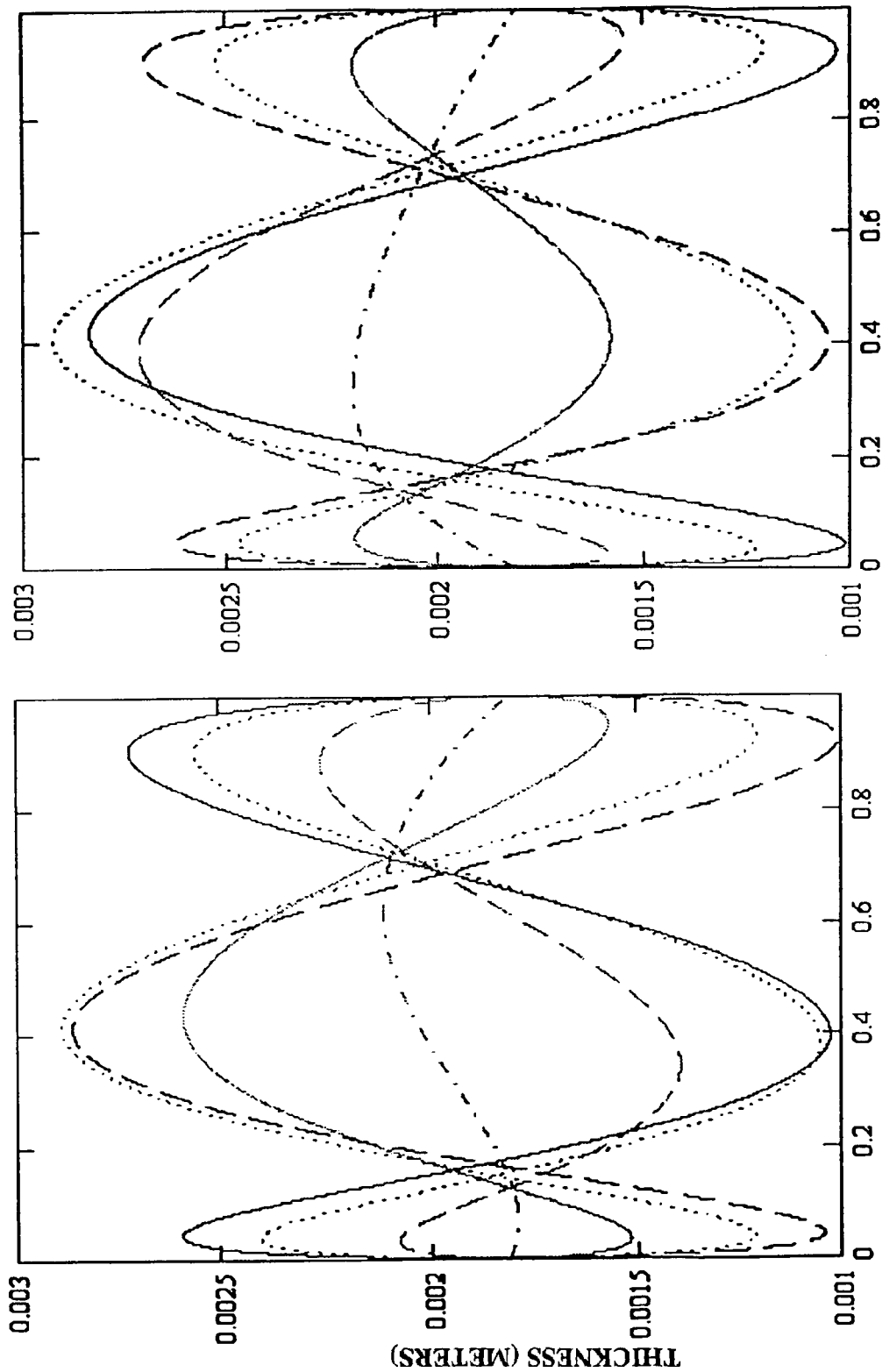

FRONT LENSES UP

FRONT LENSES DOWN

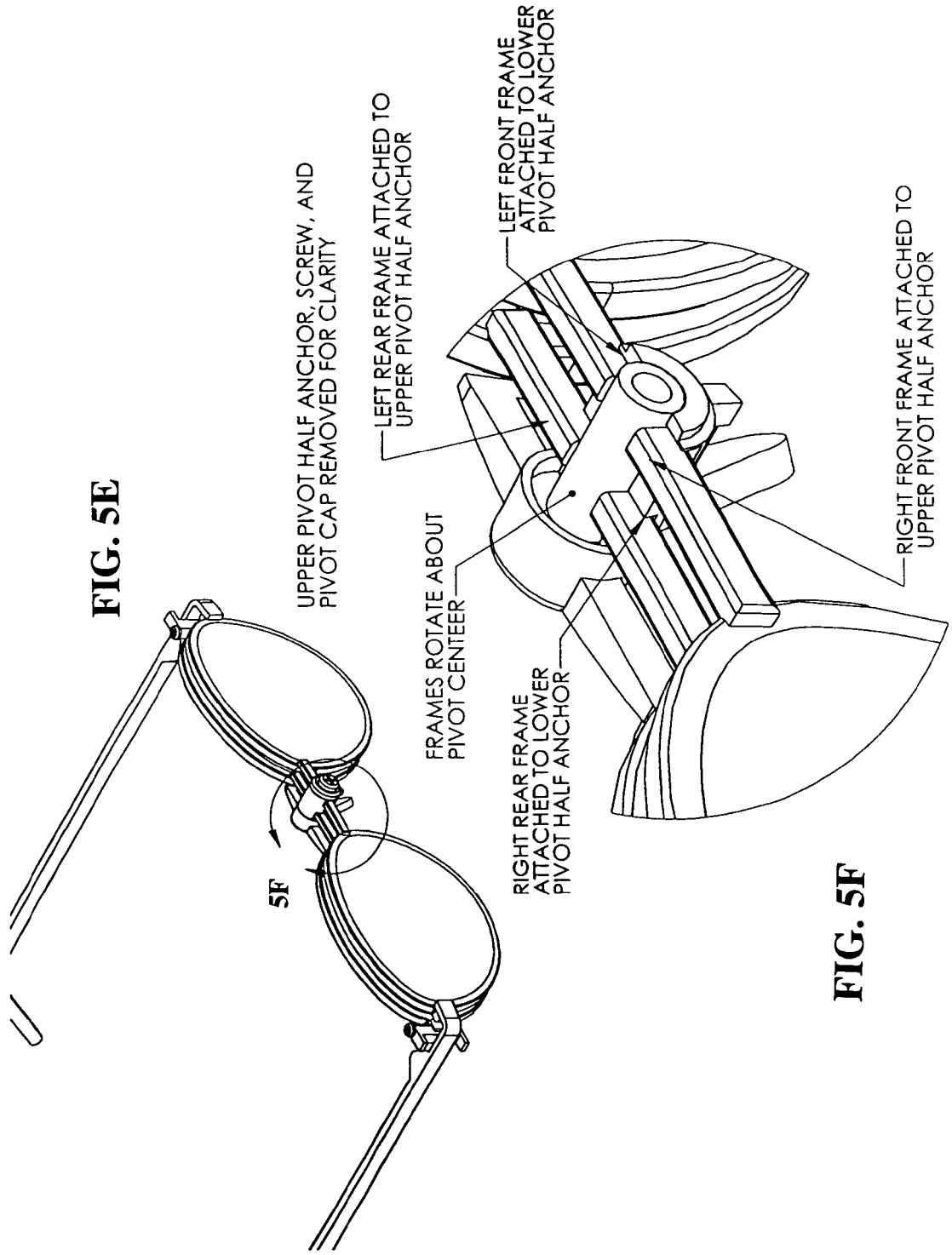

ADJUSTABLE FOCUS EYEGLASSES WITH PIVOT ADJUSTMENTS

This application is a continuation in part of U.S. patent applications, Ser. No. 11/085,436 filed Mar. 21, 2005 now U.S. Pat. No. 7,372,646 Ser. No. 11/243,944 filed Oct. 5, 2005 now U.S. Pat. No. 7,232,217 and Ser. No. 11/387,023 filed Mar. 21, 2006 now U.S. Pat. No. 7,338,159. This invention relates to eyeglasses and in particular to adjustable focus eyeglasses.

BACKGROUND OF THE INVENTION

Nearsightedness and Farsightedness

Nearsightedness is a condition of the eye in which distance objects cannot be focused on the retina and farsightedness is a condition of the eye in which near objects cannot be focused on the retina. These conditions are normally corrected by spectacle lenses having a power needed to correct the eye's focus error.

Astigmatism

Astigmatism is a condition of the eye caused by an irregular curvature of an eye surface, usually the front surface. It can be corrected by a spectacle lens in which at least one surface has a different curvature in different planes through the lens axis.

Thin Lenses

In ophthalmology and optometry it is customary to specify the focal length of spectacle lenses in diopters. The power P of any lens in diopters D is defined as the reciprocal of the focal length f in meters (i. e., P=1/f). For thin lenses, the power P of a two lens ($P_1$ and $P_2$) stacked combination is the sum of the power of the two lenses (i. e., $P=P_1+P_2$). Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

The Human Eye

The adjustable lens of the human eye, called the "crystalline lens", is located immediately behind the iris. The crystalline lens is comprised of 4 layers, from the surface to the center: the capsule, the sub-capsular epithelium, the cortex and the nucleus. The lens capsule is a clear, membrane-like structure that is quite elastic, a quality that keeps it under constant tension. As a result, the lens naturally tends toward a rounder or more globular configuration, a shape it must assume for the eye to focus at a near distance. Slender but very strong suspending ligaments, which attach at one end to the lens capsule and at the other end to protrusions of the circular ciliary body around the inside of the eye, hold the lens in place. When the ciliary body relaxes, the protrusions pull on the suspending ligaments, which in turn pull on the lens capsule around its equator. This causes the entire lens to flatten or to become less convex, enabling the lens to focus light from objects at a far away distance. Likewise when the ciliary muscle contracts, tension is released on the suspending ligaments, and on the lens capsule, causing both lens surfaces to become more convex again and the eye to be able to refocus on near objects. This adjustment in lens shape, to focus at various distances, is referred to as "accommodation". The "amplitude of accommodation" of an eye is the maximum amount that the eye's crystalline lens can accommodate. This amount is very high when young and decreases with age.

The cornea of the human eye is also important in providing focus. In fact, the cornea provides by far the greatest optical power in the eye, with a power of 43.0 D. The entire optical system of the eye has a power of 58.6 D. This causes the light entering the eye to focus onto the retina. The power of the cornea cannot be adjusted, except by surgery.

Presbyopia

After age 40 in most people (and by age 45 in virtually all people) a clear, comfortable focus at a near distance becomes more difficult with eyes that see clearly at a far distance. This normal condition is known as "presbyopia", and is due both to a lessening of flexibility of the crystalline lens and to a generalized weakening of the ciliary muscle. By the time one reaches 65 or so, the crystalline lens is virtually incapable of changing shape. Unless one is nearsighted, it is not possible to focus objects (such as a printed page) clearly at even an arm's length distance. The amount of presbyopia inevitably increases with age. Eyeglasses are usually used to provide correct focus as needed. These eyeglasses include bifocal, trifocal, and continuous focal glasses. Other solutions include separate glasses for distance and reading.

Attempts have been made to design glasses providing adjustable focus. Suggested techniques include: (1) pumping a clear fluid between thin lenses that bulge with increasing pressure (U.S. Pat. No. 2,567,581), (2) use of voltage controlled liquid crystal nematic material to change refractive indexes (U.S. Pat. No. 5,359,444) and (3) use of a variety of pixilated electro-active materials (U.S. Pat. No. 6,733,130). These prior art patents are incorporated herein by reference. These prior art patents disclose techniques for finding automatic focus settings for these glasses. These techniques include range finders and small camera viewing of both eyes to detect distances being observed. These prior art patents also describe small processors and drivers to control focus based on estimates of the distances.

Bifocals, trifocal and continuous focus glasses all have their problems as is well known by the people who wear them, and the automatic focus glasses have not been successful in solving the problems. Surgery can correct vision problems in many cases, but eye surgery is expensive and many people who can afford eye surgery, prefer to avoid it.

Alvarez Adjustable Focus Patents

Luis W. Alvarez patented a variable power lens system in 1967 (U.S. Pat. No. 3,305,294) and another in 1970 (U.S. Pat. No. 3,507,565). These patents describe lens systems comprised of two complementary lenses in which the thicknesses of the two lenses were determined by the formula:

$$t = A[xy^2 + (1/3)x^3] + Dx + E$$

where A is positive for one lens and negative for the other, D is a coefficient to minimize lens thicknesses and may be zero and E is a constant representing lens thickness at the optic axis. Combining the two lenses produced a lens unit with a focus that could be adjusted by relative motion of the two lenses in an x direction (i.e. linear direction) perpendicular to a viewing direction.

What is needed is a better technique for solving problems of human eye focus including the problems associated with presbyopia that we will all encounter, if we live long enough.

SUMMARY OF THE INVENTION

The present invention provides a pair of adjustable focus eyeglasses having two lens units with at least one of the lens units having at least two lens elements. A mechanism is provided to pivot, about a pivot location outside each of the two lens units of each lens unit, the position of at least one of the two lens elements relative to the other lens element in an angular direction generally perpendicular to a viewing direction. At least a portion of a surface of the first lens element is a specially designed surface defining a first complementary surface and at least a portion of a surface of the second lens element is a surface defining a second complementary surface that is substantially complementary to the first complementary surface. The specially designed surfaces are chosen such that small angular adjustments of the relative positions of the two lenses around a common pivot position in angular directions perpendicular or approximately perpendicular to a viewing direction results in changes in the combined focus of the two lenses of the lens unit. Preferred embodiments include two lens units with the lens system defining pairs of adjustable focus eyeglasses.

In preferred embodiments the pivot point is equidistant from the two eyes. This point can be the midpoint between the two eyes, or any point above or below the midpoint. For this discussion we define this center point to be the origin:

$$x=0 \ y=0 \ z=0$$

Define the direction away from the face to be the z direction, up/down the x direction, right/left the y direction. In the xy plane we can use $r\theta$ coordinates, where $$x = r \cdot \sin(\theta) \ y = r \cdot \cos(\theta)$$

and $r=0$ at the origin.

We want the lens pair to have a variable optical power as we rotate them differentially in $\theta$. This variable power will be a function of the angle that we rotate the lenses.

The shapes of the lenses are complementary, and the basic thickness is defined by $$T1(r, \theta) = \frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r) + T1_{base}(r, \theta)$$

for the first lens, and $$T2(r, \theta) = -\left(\frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r)\right) + T2_{base}(r, \theta)$$

for the second lens. In these expressions, $$r_c, \theta_c$$

are the nominal center coordinates of the lens power expressed in radial coordinates, and they are constants chosen for optimization of the lens shapes for manufacturability, strength, optical properties, and weight. This center coordinate is usually near the center of the lens.

K is a constant which determines the strength of the lens pair for a given rotation.

K' is a constant picked for optimization of the lenses.

f(r) is any function of r which is convenient, picked for optimization of the lenses.

$T1_{base}$ and $T2_{base}$ are the base thickness functions. These functions are picked to give approximately non-variable properties which do not vary much as the lenses are rotated. These functions include a base thickness, and may include a prescription surface. The prescription surface will be discussed later. The total thickness when the lenses are stacked is:

$$T_{total} = T1(r, \theta + \theta 1) + T2(r, \theta + \theta 2)$$

This simplifies to $$T_{total} = T1_{base}(r, \theta + \theta 1) + T2_{base}(r, \theta + \theta 2) \ldots + \frac{1}{2} \cdot K \cdot (\theta 1 - \theta 2) \cdot [(x - x_c)^2 + (y - y_c)^2] + \frac{1}{2} \cdot [K \cdot r_c^2 + 2 \cdot K' - K \cdot (x_c^2 + y_c^2)] \cdot (\theta 1 - \theta 2)$$

This total thickness contains in the second line the equation for a parabolic lens centered at $x_c, y_c$, with strength in diopters given by $$-(n-1) \cdot K \cdot (\theta 1 - \theta 2)$$

where n is the index of refraction of the material. Thus, the strength is proportional to the difference in angle moved. In the preferred embodiment, we use a base setting of one diopter, divided equally between the lenses, so that $T1_{base}$ and $T2_{base}$ each have ½ diopter. The movement positions vary from $$\theta 1 = 2.5 \text{ deg } \theta 2 = -2.5 \text{ deg}$$

which adds -1 diopter for a total of 0 diopters, to $$\theta 1 = -2.5 \text{ deg } \theta 2 = 2.5 \text{ deg}$$

which adds +1 diopter for a total of 2 diopters. Thus by controlling the angle that the lenses are rotated, we can set the power of the lens pair to any value from 0 to 2 diopters.

In a preferred embodiment one of the surfaces of each lens will be a portion of the surface of a sphere with a constant radius. In this case the equation for the other surface would be the sum of the first surface and the thickness function. In a preferred embodiments with two lenses defining an outer surface, two middle surfaces and an inside surface, the inner and outer surfaces are spherical with the outer surface having a slightly smaller radius of curvature than the inner surface. This provides the lens unit a basic power when the two lenses are in their null position. The two middle surfaces are provided with the special surfaces as defined by the above equations modified in each case by the curvature of their second surfaces. With this arrangement the lenses need to be rotated around the pivot point relative to each other to produce a zero power for the lens unit. The special surfaces are not limited to the middle surfaces, and could be on any or all of the four surfaces, as long as the thickness is given by the above expressions.

OTHER TECHNIQUES

Sweet Spot Design

In preferred embodiments a sweet spot is provided in the region of the lenses centered directly in front of the wearer's eyes (when looking straight ahead), and within a certain cone angle, by precise application of the above equations in the sweet spot, but choosing a different lens design outside the sweet spot. This can have the effect of minimizing thickness differences at the edges of the lenses.

Prescription Surfaces

Prescription surfaces can be added in addition to the special surfaces described above when additional prescription correction is needed by particular patients. Prescription surfaces which include focus and astigmatism are not affected by translation in the x,y plane. Focus in addition is not affected by rotation. There is a small amount of rotation in the lenses which does have a small, often negligible effect on astigmatism. This effect is further mitigated if the prescription is divided equally between the two lenses, and the motion of the two lenses is complementary, in which case most of the error cancels.

Adjustable Frame Designs

In preferred embodiments two lens units, each lens unit having two lens elements are mounted in a frame to provide eyeglasses with adjustable focus. Several designs are described. Techniques for automatic focusing of the lenses are also disclosed and claimed.

BRIEF DESCRIPTION OF THE DRAWINGS

FIGS. 1A-1G are drawings showing features of a preferred embodiment providing angular adjustment of the lenses of a set of eyeglasses using a scissors-type configuration.

FIGS. 2A-2G are drawings showing features of a preferred embodiment providing angular adjustment of the lenses of a set of eyeglasses where front lenses pivot relative to back lenses.

FIG. 3 shows how the lens elements pivot about a pivot point equidistant between the lens units in a preferred embodiment.

FIGS. 4A and 4B are graphs showing varying lens thicknesses in a preferred embodiment.

FIGS. 5A-5H show features of a preferred embodiment having a special pivot mechanism that can be easily disassemble to permit cleaning of the lens elements.

DETAILED DESCRIPTION OF PREFERRED EMBODIMENTS

Angular Relative Adjustment About a Pivot

Theory

Figure 5A:
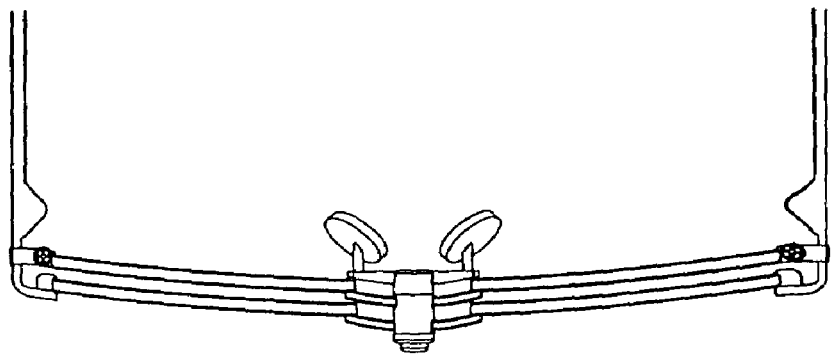

The present invention provides adjustable focus eyeglasses made with lens pairs that are differentially rotated around a pivot point outside of the lenses. The rotation is in a rotation plane approximately perpendicular to the axes of the lenses and about a pivot point in the rotation plane. In embodiments of the present invention the surface design of the lenses is much more complicated than in the Alvarez type embodiments and the designs described in the parent applications referred to in the opening sentence of this specification, but the mechanism to move the lenses to achieve desired focusing power turns out to be simpler and more precise as compared to the linear movements. The pivot point is preferably equidistant from the two eyes. This preferred rotation point can be the midpoint between the two eyes, or any point above or below the midpoint. For this discussion as shown in FIG. 3, we define this rotation point 150 to be an origin:

$$x=0 \; y=0 \; z=0$$

We define a direction away from the face to be the z direction, up/down the x direction, right/left the y direction. In the xy plane we can use $r\theta$ coordinates, where $$x = r \cdot \sin(\theta) \; y = r \cdot \cos(\theta)$$

and $r=0$ at the origin.

We want the lens pair to have a variable optical power as we rotate them differentially in $\theta$. This variable power will be a function of the angle that we rotate the lenses. The shapes of the lenses are complementary, and the basic thickness is defined by $$T1(r, \theta) = \frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r) + T1_{base}(r, \theta)$$

for the first lens, and $$T2(r, \theta) = -\left( \frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r) \right) + T2_{base}(r, \theta)$$

for the second lens. In these expressions, $$r_c, \theta_c$$

are the nominal center coordinates of the lens power expressed in radial coordinates, and they are constants chosen for optimization of the lens shapes for manufacturability, strength, optical properties, and weight. This center coordinate is usually near the center of the lens.

K is a constant which determines the strength of the lens pair for a given rotation.

K' is a constant picked for optimization of the lenses.

f(r) is any function of r which is convenient, picked for optimization of the lenses.

$T1_{base}$ and $T2_{base}$ are the base thickness functions. These functions are picked to give approximately non-variable properties which do not vary much as the lenses are rotated. These functions include a base thickness, and may include a prescription surface. The prescription surface will be discussed later.

The sum of the thicknesses is the total effective thickness. We will form this sum for lenses rotated by $\theta1$ and $\theta2$, respectively. In the preferred case, $\theta1=-\theta2$, but in general, they just need to be different values:

$$T_{total} = T1(r, \theta+\theta1) + T2(r, \theta+\theta2)$$

When we substitute the expressions, $$T_{total} = \frac{1}{2} \cdot K \cdot r^2 \cdot (\theta + \theta 1) - \sin(\theta + \theta 1 - \theta_c) \cdot K \cdot r \cdot r_c +$$
$$\frac{1}{2} \cdot K \cdot r_c^2 \cdot (\theta + \theta 1) + K' \cdot (\theta + \theta 1) + f(r) + T1_{base}(r, \theta + \theta 1) \ldots +$$
$$-\left[\frac{1}{2} \cdot K \cdot r^2 \cdot (\theta + \theta 2) - \sin(\theta + \theta 2 - \theta_c) \cdot K \cdot r \cdot r_c +\right.$$
$$\left.\frac{1}{2} \cdot K \cdot r_c^2 \cdot (\theta + \theta 2) + K' \cdot (\theta + \theta 2) + f(r)\right] + T2_{base}(r, \theta + \theta 2)$$

This simplifies to $$T_{total} = T1_{base}(r, \theta + \theta 1) + T2_{base}(r, \theta + \theta 2) \ldots +$$
$$\frac{1}{2} \cdot K \cdot (\theta 1 - \theta 2) \cdot r^2 + \frac{1}{2} \cdot (K \cdot r_c^2 + 2 \cdot K') \cdot (\theta 1 - \theta 2) \ldots +$$
$$-K \cdot r_c \cdot r \cdot 2 \cdot \cos\left(\theta + \frac{\theta 1 + \theta 2}{2} - \theta_c\right) \cdot \sin\left(\frac{\theta 1 - \theta 2}{2}\right)$$

The second 2 lines can be seen to be the equation in radial coordinates for a parabola, which produces optical power in a lens. To see the parabola explicitly, replace $x = r \cdot \sin(\theta)$  $y = r \cdot \cos(\theta)$ to give $$T_{total} = T1_{base}(r, \theta + \theta 1) + T2_{base}(r, \theta + \theta 2) \ldots +$$
$$\frac{1}{2} \cdot K \cdot (\theta 1 - \theta 2) \cdot (x^2 + y^2) + \frac{1}{2} \cdot (K \cdot r_c^2 + 2 \cdot K') \cdot (\theta 1 - \theta 2) \ldots +$$
$$-K \cdot r_c \cdot 2 \cdot \left(y \cdot \cos\left(\frac{\theta 1 + \theta 2}{2} - \theta_c\right) - x \cdot \sin\left(\frac{\theta 1 + \theta 2}{2} - \theta_c\right)\right) \cdot \sin\left(\frac{\theta 1 - \theta 2}{2}\right)$$

The center of this parabola is at $$x_c = r_c \cdot \sin\left(\theta_c - \frac{\theta 1 + \theta 2}{2}\right) \cdot \frac{2 \cdot \sin\left(\frac{\theta 1 + \theta 2}{2}\right)}{\theta 1 - \theta 2}$$

$$y_c = r_c \cdot \cos\left(\theta_c - \frac{\theta 1 + \theta 2}{2}\right) \cdot \frac{2 \cdot \sin\left(\frac{\theta 1 - \theta 2}{2}\right)}{\theta 1 - \theta 2}$$

Using the center coordinates the total thickness can now be written simply:

$$T_{total} = T1_{base}(r, \theta + \theta 1) + T2_{base}(r, \theta + \theta 2) \ldots +$$
$$\frac{1}{2} \cdot K \cdot (\theta 1 - \theta 2) \cdot [(x - x_c)^2 + (y - y_c)^2] +$$
$$\frac{1}{2} \cdot [K \cdot r_c^2 + 2 \cdot K' - K \cdot (x_c^2 + y_c^2)] \cdot (\theta 1 - \theta 2)$$

This total thickness contains in the second line the equation for a parabolic lens centered at $x_c$, $y_c$, with strength in diopters given by $-(n-1) \cdot K \cdot (\theta 1 - \theta 2)$ where n is the index of refraction of the material. Thus, the strength is proportional to the difference in angle moved. In the preferred embodiment, we use a base setting of one diopter, divided equally between the lenses, so that $T1_{base}$ and $T2_{base}$ each have ½ diopter. The movement positions vary from $\theta 1 = 2.5$ deg $\theta 2 = -2.5$ deg which adds −1 diopter for a total of 0 diopters, to $\theta 1 = -2.5$ deg $\theta 2 = -2.5$ deg which adds +1 diopter for a total of 2 diopters. Thus by controlling the angle that the lenses are rotated, we can set the power of the lens pair to any value from 0 to 2 diopters.

Angular Adjustment with Crossover Pivot Mechanism

FIGS. 1A-1G are drawings showing features of a preferred embodiment providing angular adjustment of the lenses of a set of eyeglasses using a Crossover Pivot configuration. In this configuration the lenses pivot about a pivot mechanism 150 identified in FIGS. 1B and 1G. Nose pieces 152 are attached rigidly to pivot axel 154 in pivot mechanism 150. All four lenses pivot about pivot mechanism 150. Right front lens 156 is rigidly attached to left rear lens 158 and left front lens 160 is rigidly attached to right rear lens 162 so the lenses move in a scissors-like manner about pivot mechanism 150. The pivot mechanism 150 and the connections to the lenses and nose piece are shown in FIG. 1G. Each of the two ear supports 164 attach to one of the rear lenses in the manner shown in FIG. 1D.

Angular Adjustment with Pivoting Front Lenses

FIGS. 2A-2G are drawings showing features of a preferred embodiment providing angular adjustment of the lenses of a set of eyeglasses where front lenses pivot relative to back lenses. In this embodiment both rear lenses are rigidly attached to the nose piece and hinge-like to ear supports 164. The front lenses pivot about pivot 150A. Tab units 166 attached to the front lenses limit range of movement of the front lenses.

Angular Adjustment with Special Pivot Mechanism

Figure 5B:
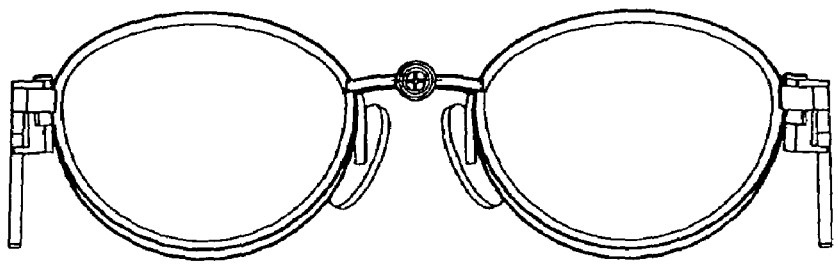
Figure 5C:
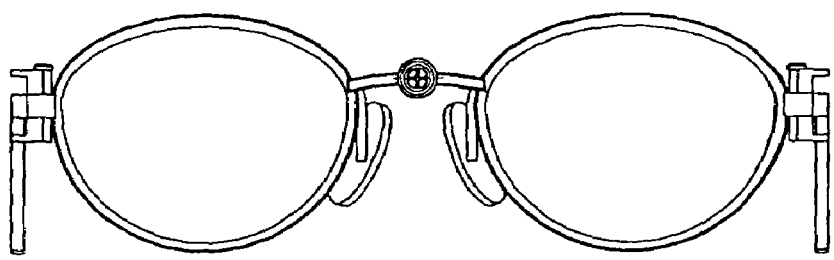
Figure 5D:
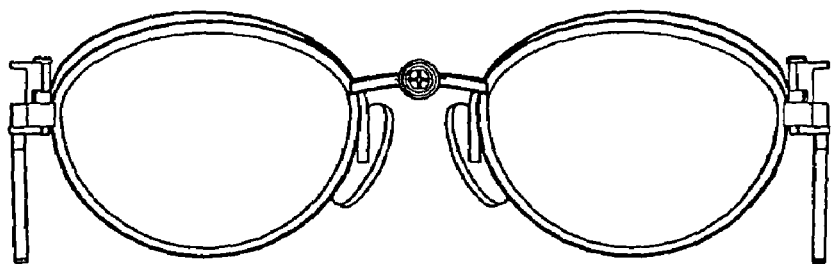
Figure 5G:
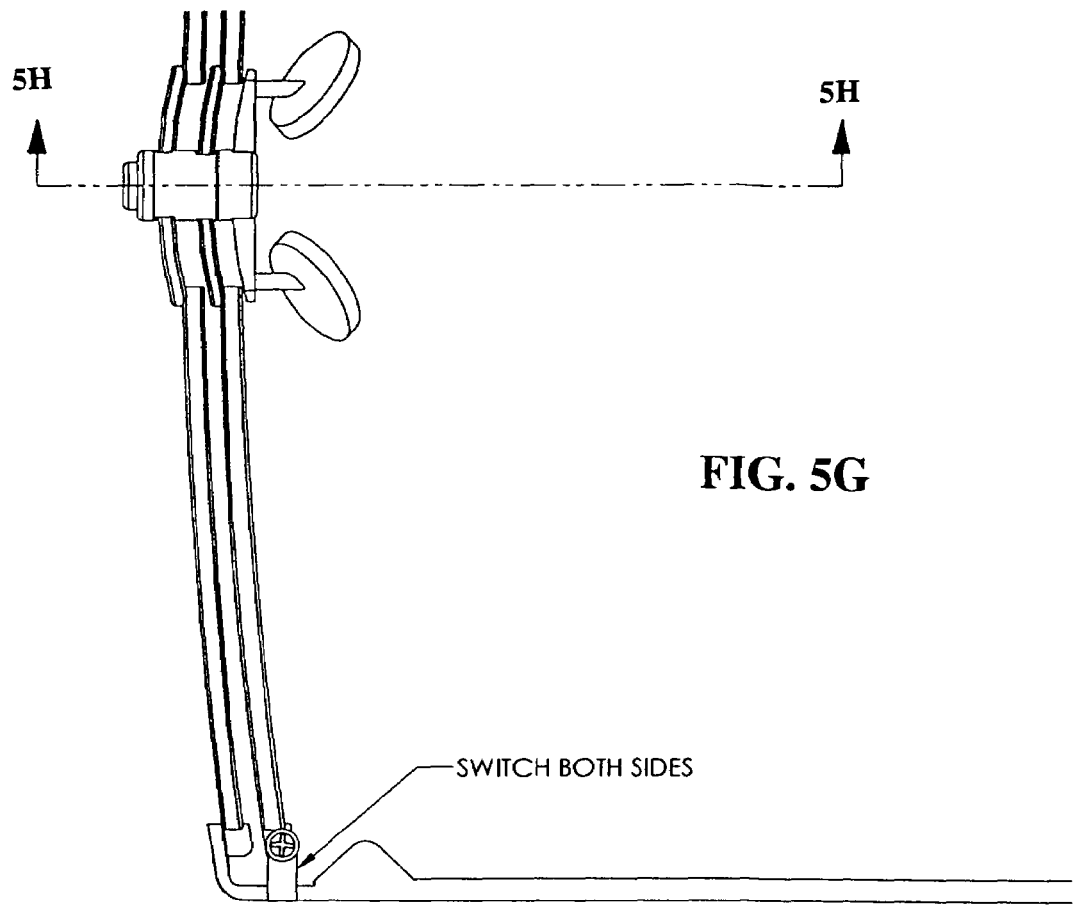
Figure 5H:
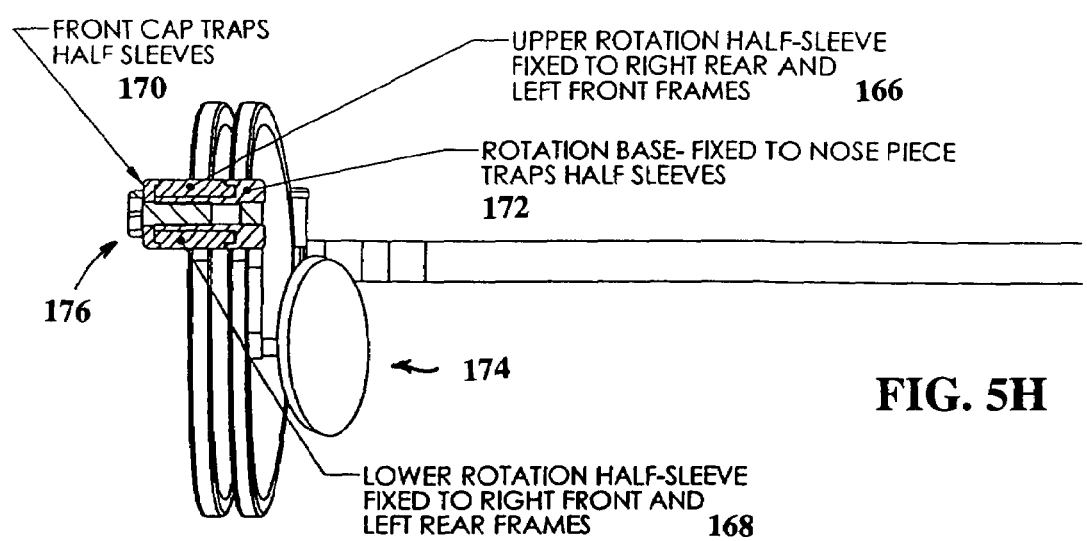

FIGS. 5A-5H show detailed design features of a preferred embodiment having a special pivot mechanism that can be easily disassemble to permit cleaning of the lens elements. In this design, which is similar the design shown in FIGS. 1A-1G, the pivot mechanism is provided by two half-sleeves 166 and 168 which are trapped by front cap 170 and which rotate about a rotation base 172 that is fixed to nose piece 174, with the right front and left rear lens elements rigidly attached on one half-sleeve and the left front and right rear lens elements rigidly attached on the other half-sleeve. The sleeves being trapped by the base and the end cap can only rotate. Some friction is preferably built in to hold the positions of the lens elements when no force is being applied. Additional friction can be applied by tightening Philips screw 176 which can also be removed to permit disassembly and cleaning the inside surfaces of the lens elements.

Advantages of Adjustment about a Pivot Point

The special surface design to provide adjustable focus about a pivot point is quite a bit more complicated than the surface design for a linear adjustment. However, as indicated in FIGS. 1A-1G movement of the lenses about a pivot point greatly simplifies the frame design to accomplish the relative lens movements as compared to sliding the lenses linearly in a linear direction as proposed in Alvarez patents. With the pivot type embodiments, existing frame designs can be used along with a simple pivot type mechanism as shown in FIG.

1G. The pivot design as shown in FIG. 1A-1G assures that all relative movements are perfectly symmetrical. This is difficult to accomplish with the linear motion techniques as proposed by Alvarez.

Prescription Based Surfaces

Prescription surfaces can be added in addition to the special surfaces described above when additional prescription correction is needed by particular patients. Prescription surfaces which include focus and astigmatism are not affected by translation in the x,y (or r,θ) plane. Focus in addition is not affected by rotation. There is a small amount of rotation in the lenses which does have a small, often negligible effect on astigmatism. This effect is further mitigated if the prescription is divided equally between the two lenses, and the motion of the two lenses is complementary, in which case most of the error cancels.

Higher order corrections than focus and astigmatism can be affected by both the translation and rotation, but the effect is again mitigated by dividing the prescription equally between the lenses and using complementary motion, for which most of the errors introduced will cancel.

Sweet Spot Design

In order to provide lenses which are as thin as possible for a given strength, it may be desirable to use surfaces which are described as above when close to the lens center in a "sweet spot" of the lens, but "taper off" toward the edge to reduce the lens thickness. These lenses can be designed by first defining the resulting thickness function F(x,y) that we want to achieve from the pair of lenses.

An example function would be to start with the parabola function which provides power, and add a higher order term which reduces the power toward the edges:

$$F(x, y) = \left[ \begin{array}{c} (x - x_c)^2 + \\ (y - y_c)^2 \end{array} \right] \cdot \frac{K}{2} + K' + \left[ \begin{array}{c} (x - x_c)^2 + \\ (y - y_c)^2 \end{array} \right]^2 \cdot -\alpha$$

With small, positive a the above expression is tapered toward the edges. There are many other functions which also provide tapering. To derive the shape for the lenses, first we express the function in radial coordinates:

$x = r \cdot \sin(\theta)$  $y = r \cdot \cos(\theta)$ $F(r \cdot \sin(\theta), r \cdot \cos(\theta))$ Now we compute the integral of this function with respect to θ:

$T(r,\theta) = \int F(r \cdot \sin(\theta), r \cdot \cos(\theta)) d\theta + f(r)$ This integral can be performed analytically or numerically. The integration constant f(r) can be any function of r, picked to optimize the lens shapes. The resulting T function is applied to one of the lenses, and the complementary (negative) function is applied to the other lens. When the lenses are differentially rotated, the total thickness function will be approximately proportional to the relative angle, and to the desired thickness function F(x,y).

An alternative means of computing the thickness function T is to use a commercial lens design program such as Zemax, define the lens motions desired, define initial lens shapes based on the equations described above, define the performance metrics for the lenses based on a human eye looking through the lenses at various angles, define relative weighting for the performance of the lenses in the various configurations and view angles, define constraints on the lenses such as minimum lens thickness, and let the lens design software find an optimum.

Choosing Parameters:

The equations above have a variety of variable parameters. In general, we want the thickness of the lens to deviate as little as possible from a central value, while providing the variable power we desire with a minimum of motion. These parameters are picked based on the following factors:

1. There will be a minimum lens thickness required for manufacturability and safety.
2. The total weight of the lens should be minimized.
3. The motion for a given optical power should be minimized.

These parameters must be balanced with each other. In our preferred embodiment, we require the lens to have a 1 mm minimum thickness, 2 mm average thickness, and correct 0 to 2 diopters. Under these constraints, the variable parameters can be optimized to yield the smallest motion. This motion can be further reduced by using the tapering technique described above.

As an example for a preferred embodiment, we take the following parameters:

lens shape elliptical
lens height H=34 mm
lens width W=50 mm
lens separation with other eye 18 mm
lens pivot point 5 mm above centerline of lenses
lens center with respect to the pivot xc=−5 mm, yc=34 mm
minimum thickness 1 mm for each lens
average thickness approximately 2 mm for each lens
index of refraction n=1.5
angular motion of lenses minimized
½ diopter base power for each lens
variable power +−1 diopter for system
total power 0 to 2 diopters The lens boundary can be expressed parametrically as $$X(t) := \frac{H}{2} \cdot \sin(t) + Xc$$

$$Y(t) := \frac{W}{2} \cdot \cos(t) + Yc$$

From this we can evaluate the radius as a function of t $R(t) := \sqrt{X(t)^2 + Y(t)^2}$ and find the maximum and minimum radius values using well-known numerical techniques $r_{min} = 9.597$ mm $r_{max} = 59.263$ mm We also need a functional expression for the θ values at the top and bottom boundaries as a function of radius r: $\theta_{top}(r)$, $\theta_{bottom}(r)$. These functions are computed using well-known numerical techniques.

The base power function will be centered in the middle of the lens, $$rc = \sqrt{xc^2 + yc^2}$$

$$\theta c = \operatorname{atan}\left(\frac{xc}{yc}\right)$$

with formula $$basethickness(r, \theta) := \frac{-basepower}{(n-1)} \cdot \begin{pmatrix} \frac{1}{2} \cdot r^2 - \\ \cos(\theta - \theta c) \cdot \\ r \cdot rc + \\ \frac{1}{2} \cdot rc^2 \end{pmatrix} + basethickness_0$$

The variable power function has parameters which can be selected to minimize motion for a given thickness. The function is $$variablethickness(r, \theta) =$$

$$\frac{-variablethickness}{(n-1) \cdot \Delta\theta} \cdot \begin{pmatrix} \frac{1}{2} \cdot r^2 \cdot \theta - \\ \sin(\theta - \theta c') \cdot \\ r \cdot rc' + \\ \frac{1}{2} \cdot rc'^2 \cdot \theta \end{pmatrix} + K' \cdot \theta + f(r)$$

where the variable parameters are the wedge term K', chosen to balance the thickness, the function f(r) which can be any function of r, and the approximate variable power center rc',θc' which will typically be close to the lens center rc,θc. The parameter Δθ is the total differential angle applied, which will be made as small as possible given that the total thickness variation is sufficiently small. Note that Δθ in this case is 4 times larger than the actual motion from null, since the lenses are counter-rotated (which doubles the effect) and the motion is applied in both the positive and negative directions (also doubling the effect).

Since the variable function is added to one lens and subtracted from the other, the average thickness due to the variable function is zero. Therefore the base thickness is selected to have the desired weight properties, in this case average thickness of 2 mm. This is found numerically to occur for base thickness$_0$:=2.114 mm It is found that for this case (which will often be true for other designs which have smooth boundaries) that a good choice for f(r) is to subtract the average of the two boundaries:

$f(r) := -0.5 \cdot (variablethickness(r, \theta_{top}(r)) + variablethickness(r, \theta_{bottom}(r)))$ The total thickness for the two lenses, since we pick the base thickness to be the same and the variable thickness to be complementary, is totthickness1$(r,\theta)$:=basethickness$(r,\theta)$+variablethickness$(r,\theta)$ totthickness2$(r,\theta)$:=basethickness$(r,\theta)$−variablethickness$(r,\theta)$ To optimize, we first picked a value of Δθ=0.15, and varied rc',θc', and K', to maximize the minimum thickness. The minimum thickness is found by plotting the two functions above over the range $\theta_{top}(r), \theta_{bottom}(r)$, as r is varied from $r_{min}$ to $r_{max}$. The minimum thickness was found to be less than 1 mm, so the value of Δθ was raised to 0.17, and the procedure was repeated to give the results shown in FIGS. 4A and 4B. The vertical scale in FIGS. 4A and 4B is in meters. The seven curves in both graphs represent thickness values of the front and back lens elements at varying equally spaced radial distances from the pivot location outside the lenses. So the lines represent varying thickness along these radial arcs running from the top of the lens elements to the bottom. As shown by the graphs the thickness of the lens elements vary in this design from a little thicker than 1.0 mm to about 2.9 mm. This shows the thickness on both lenses remains greater than 1 mm, thereby fulfilling the design requirement. For this case, K':=2.75 mm rc':=30.8 mm θc':=−0.145

It should be noted that tapering was not incorporated in this design. Tapering would allow the constraints to be met for a smaller Δθ.

In order to further optimize the performance, the lens thicknesses described above can be placed into an optical design code such as Zemax. The thickness can be applied to either surface of a meniscus lens, or can be divided between the inner and outer surface. The lens design program can then modify the surfaces by modeling the aberrations that the eye sees when looking in various directions, and with the lenses rotated into the various optical power configurations.

Techniques for Use

This simple preferred embodiment of the present invention provides important improvements over prior art glasses such as bifocals, trifocals and continuous focal lenses. The lenses can each be adjusted by the user so that his viewed object is exactly in focus through all portions of the sweet spot which can be made as large as desired. This is especially advantageous if the viewed object is stationary with respect to the wearer such as when reading, working at the computer, watching TV and watching a movie.

Automatic Adjustments of Focus

Several prior art patents have proposed techniques for automatic adjustments of the focus of eyeglass lenses. These techniques attempt to determine the distance to the viewed object and then automatically adjust the focus of the lenses in the eyeglasses based on stored information so that the object is in focus for the wearer. These techniques include range finders and small camera viewing both eyes to detect distances between the pupils and small processors and drivers to calculate distances and control focus based on the calculated distances. Cues from the wearer can also be used as a signal to provide an automatic adjustment of the focus. For example, a wink of only the right eye could be a cue to increase the length of focus and a wink of only the left eye could be a cue to decrease it. Additional equipment would have to be added to the basic embodiment described above. Needed would be a motor and actuator with a power source to provide the angular displacement. A small processor could be used to translate cues provided by the range finder, camera or wearer into instructions for the motor and actuator. Specific equipment of this general type for determining distances to viewed objects is described in the patents referenced in the background section.

As an example, a system can be used to measure inter-pupil distance. This system would provide a determination of the distance of the object that the eyes are pointed at. If an object is far away, each eye is pointed in approximately the same direction. As the object moves closer, the eyes start to cross so that both are pointed at the object. Small cameras can take digital images of each of the eyes and a miniature digital processor can compute the offset distance that maximizes the correlation of the two images. This offset, when added to the camera separation, yields inter-pupil distance. This inter-pupil distance can be converted by the same digital processor into a range to the object, which is then converted to an offset distance for the sliding lenses. The processor then commands the motor/actuator to position the lenses in the proper position.

Variations

The reader should understand that the present invention is not limited to the specific embodiments described above and that many modifications and additions or deletions could be made to those described embodiments. Both lens surfaces of a lens can have a common shape and still fulfill the thickness expression. There can be a net thickness on the lens unit in the null position to provide an optical base figure. This optical base figure could be applied to any or all of the lens elements in the lens unit. There can be a net prescription thickness on the lens unit in the null position. There can be more than two lenses. For example, there could be a pair of stationary lenses on the outside, each with half of one of the thickness functions, with the moving lens with the complement in between.

The pivot location does not have to be between the wearer's eyes. For example, each lens unit could be designed with a pivot location at the outside edge of the eyeglasses or at the top or bottom of the lens units. There may be situations where only one of the lens units of a pair of eyeglasses would be designed for an adjustable focus.

Manufacturing techniques for the lenses that could be employed include: machining (such as with numerically controlled equipment), molding, casting, curing of special materials, and use of gradient index lenses for which thickness is replaced by "optical path length" defined by $(n-1)*(thickness)$ where n is the index of refraction. Potential range finders include optical, laser and acoustic. Cues for automatic changing of focus could include blinking, eyebrow motion, head motion, and hand switches.

In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term "approximately" in connection with these equations with the intention of claiming systems that utilize surfaces that are defined by equations that are not exactly the same as the referenced equations but achieve the same result within the tolerance of the lens system as it is being applied. When applied to eyeglasses the applicable tolerance is the ability of the human eye to detect a difference.

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. A pair of adjustable focus eyeglasses comprising:
   A) an adjustable focus left lens unit comprising a left front lens element and a left rear lens element, said left front lens element having at least one specially designed complementary surface defining a front left varying lens thickness, and said left rear lens element having at least one specially designed complementary surface, defining a rear left varying lens thickness complementary to said front left varying lens thickness, such that adjustments of relative angular positions of said left front and said left rear lens elements about a left lens pivot location outside of both the left front and left rear lens elements in an angular direction perpendicular or approximately perpendicular to a viewing direction results in changes in the combined focusing power of the left lens unit;
   B) an adjustable focus right lens unit comprising a right front lens element and a right rear lens element, said right front lens element having at least one specially designed complementary surface, defining a front right varying lens thickness, and said right rear lens element having at least one specially designed complementary surface, defining a rear right varying lens thickness complementary to said front right varying lens thickness, such that adjustments of relative angular positions of said right front and said right rear lens elements about a right lens pivot location outside of both the right front and right rear lens elements in an angular direction perpendicular or approximately perpendicular to a viewing direction results in changes in the combined focusing power of the right lens unit;
   C) an eyeglasses frame for holding said left and right adjustable focus lens units in place in front of a user's eyes and permitting focus adjustment of said lens units comprising:
      i. two ear support elements,
      ii. a nose piece,
      iii. at least one pivot mechanism adapted for pivoting at least one lens element in said right lens unit about said right lens pivot location and pivoting at least one lens element in said left lens unit about said left lens pivot location.

2. The pair of eyeglasses as in claim 1 wherein said at least one pivot mechanism is one pivot mechanism and said left lens pivot location and said right lens pivot location are co-located within said one pivot mechanism.

3. The pair of eyeglasses as in claim 2 and further comprising four pivot arms each of the four pivot arms connecting one lens element to the one pivot mechanism.

4. The pair of eyeglasses as in claim 3 wherein the front lens element of the right lens unit is rigidly connected via two of said four pivot arms and a first pivotable portion of the one pivot mechanism to the front lens element of said left lens unit and the rear lens element of the right lens unit is rigidly connected via two of said four pivot arms and a second pivotable portion of the one pivot mechanism to the rear lens element of said left lens unit.

5. The pair of eyeglasses as in claim 3 wherein the front lens element of the right lens unit is pivotably connected via two of said four pivot arms and the one pivot mechanism to the rear lens element of said right lens unit and the front lens element of the left lens unit is pivotably connected via two of said four pivot arms and the one pivot mechanism to the rear lens element of said left lens unit.

6. The pair of eyeglasses as in claim 1 wherein one of the left front and left rear lenses and one of the right front and right rear lenses each define a first lens and the other of said left front and left rear lenses and one of the right front and right rear lenses define a second lens, the varying thicknesses of the front and back lens elements in both the left and right lens units are defined by:

$$T1(r, \theta) = \frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r) + T1_{base}(r, 0)$$

for the first lens, and $$T2(r, \theta) = -\left(\frac{1}{2} \cdot K \cdot r^2 \cdot \theta - \sin(\theta - \theta_c) \cdot K \cdot r \cdot r_c + \frac{1}{2} \cdot K \cdot r_c^2 \cdot \theta + K' \cdot \theta + f(r)\right) + T2_{base}(r, \theta)$$

for the second lens,
where $r_c, \theta_c$ are the nominal center coordinates of the lens power expressed in radial coordinates and they are constants chosen for optimization of the lens shapes for manufacturability, strength, optical properties, and weight;
K is a constant which determines the strength of the lens pair for a given rotation;
K' is a constant picked for optimization of the lenses;
f(r) is any function of r picked for optimization of the lenses, wherein r is a radius; and
$T1_{base}$ and $T2_{base}$ are the base thickness functions.

7. The pair of eyeglasses as in claim 6 wherein the front lens element of the right lens unit is rigidly connected via two of said four pivot arms and a first pivotable portion of the one pivot mechanism to the rear lens element of said left lens unit and the front lens element of the left lens unit is rigidly connected via two of said four pivot arms and a second pivotable portion of the one pivot mechanism to the rear lens element of said right lens unit.

8. The pair of eyeglasses as in claim 1 wherein said right lens unit defines a right lens unit optical axis and said left lens unit defines a left lens unit optical axis and said one pivot mechanism is located midway between the left lens unit optical axis and the right lens unit optical axis.

9. The pair of eyeglasses as in claim 1 wherein each of said two ear support elements are hingedly attached to one of said left or right rear lens elements.

10. The pair of eyeglasses as in claim 1 wherein each of said two ear support elements are hingedly attached to one of said left or right front lens elements.

11. The pair of eyeglasses as in claim 1 and further comprising at least two finger operated pivot adjustment tabs to adjust the focus of each of the two the lens units.

12. The pair of eyeglasses as in claim 11 wherein the tabs are adapted to be operated with fingers of one hand.

13. The pair of eyeglasses as in claim 11 wherein the tabs are adapted to be operated with fingers of two hands.

14. The pair of eyeglasses as in claim 1 wherein said pivot adjustment mechanism is a motor driven pivot adjustment mechanism.

15. The pair of eyeglasses as in claim 14 wherein said motor driven pivot adjustment mechanism is adapted for automatic adjustment.

16. The pair of eyeglasses as in claim 14 and further comprising a means for distance measurement wherein said motor driven pivot adjustment mechanism is adapted for control based on a distance measurement.

17. The pair of eyeglasses as in claim 14 wherein said motor driven pivot adjustment mechanism is adapted for control based on a measurement of a wearer's eye positions.

18. The pair of eyeglasses as in claim 14 wherein said motor driven pivot adjustment mechanism is adapted for control based on special cues from a wearer.

19. The pair of eyeglasses as in claim 1 and further comprising a pivot position stabilizing means for stabilizing the pivot position of the lens elements at a desired focus.

20. The pair of eyeglasses as in claim 19 wherein said pivot position stabilizing means comprises at least one detent.

21. The pair of eyeglasses as in claim 19 wherein said pivot position stabilizing means comprises frictional force means for stabilizing the position by frictional force.

22. The pair of eyeglasses as in claim 19 wherein said pivot position stabilizing means comprises at least one magnet stabilizing the position by magnetic force.

23. The pair of eyeglasses as in claim 19 wherein said pivot position stabilizing means is incorporated into said pivot adjustment mechanism.

24. The pair of eyeglasses as in claim 1 wherein said nose piece is comprised of two nose pads.

25. The pair of eyeglasses as in claim 24 wherein one of said two nose pads is attached to one of said front or rear left lens elements and the other of said nose pads is attached to said front or rear right lens elements.

26. The pair of eyeglasses as in claim 24 wherein the at least one pivot mechanism is one pivot mechanism and both of said nose pads are attached to said one pivot adjust mechanism.

27. The pair of eyeglasses as in claim 1 wherein at least one of said left and right lens units comprises a static aberration.

28. The pair of eyeglasses as in claim 27 wherein said static aberration is a prescription surface.

29. The pair of eyeglasses as in claim 27 wherein the static aberration is applied to a single surface of the front or rear lens element of said at least one lens unit.

30. The pair of eyeglasses as in claim 27 wherein the static aberration is applied to a more than one surface of the front or rear lens element of said at least one lens unit.

31. The pair of eyeglasses as in claim 1 wherein each of said lens units is designed to provide a sweet spot centered along a viewing direction directly in front of a user's eye and surfaces outside said sweet spot are designed to provide improved lens properties other than focus.

32. The pair of eyeglasses as in claim 31 wherein said lens properties other than focus includes a design that decreases focus power as a function of distance from the sweet spot.

33. The pair of eyeglasses as in claim 1 wherein each lens element defines a front and rear surface and comprises a base shape applied to both front and rear surfaces.

34. The pair of eyeglasses as in claim 33 wherein the base shape defines a bow.

35. The pair of eyeglasses as in claim 1 wherein each lens element comprises a lens design code optimized thickness.

36. The pair of eyeglasses as in claim 1 wherein each lens unit comprises a power base to which the specialized complementary surfaces are in addition.

37. The pair of eyeglasses as in claim 1 wherein each lens element in a lens unit are approximately equivalent in size.

38. The pair of eyeglasses as in claim 1 wherein each lens element in a lens unit are substantially different in size.

39. The pair of eyeglasses as in claim 1 wherein said pivot adjust mechanism comprises a finger operated adjustment.

40. The pair of eyeglasses as in claim 1 wherein said right lens pivot location and said left lens pivot location are each located at or near an outside edge of said pair of eyeglasses.

* * * * *